United States Patent
Hahn et al.

(10) Patent No.: US 8,861,605 B2
(45) Date of Patent: Oct. 14, 2014

(54) IMAGE PROCESSING METHOD WITH MOTION ESTIMATION AND IMAGE PROCESSING ARRANGEMENT

(75) Inventors: Marko Hahn, Neubiberg (DE); Markus Schu, Erding (DE); Peter Rieder, München (DE); Christian Tuschen, Holzkirchen (DE)

(73) Assignee: Entropic Communications, Inc., San Diego, CA (US)

( * ) Notice: Subject to any disclaimer, the term of this patent is extended or adjusted under 35 U.S.C. 154(b) by 490 days.

(21) Appl. No.: 12/797,808

(22) Filed: Jun. 10, 2010

(65) Prior Publication Data

US 2010/0315560 A1 Dec. 16, 2010

(30) Foreign Application Priority Data

Jun. 16, 2009 (DE) .......................... 10 2009 026 983

(51) Int. Cl.

| | |
|---|---|
| *H04N 7/18* | (2006.01) |
| *H04N 19/59* | (2014.01) |
| *H04N 19/61* | (2014.01) |
| *G06T 3/00* | (2006.01) |
| *H04N 7/01* | (2006.01) |
| *H04N 19/533* | (2014.01) |
| *H04N 19/577* | (2014.01) |
| *H04N 19/176* | (2014.01) |
| *H04N 19/51* | (2014.01) |
| *H04N 19/60* | (2014.01) |

(52) U.S. Cl.
CPC ........... *H04N 19/00757* (2013.01); *H04N 7/18* (2013.01); *H04N 7/50* (2013.01); *H04N 7/26244* (2013.01); *H04N 7/462* (2013.01); *H04N 7/30* (2013.01); *G06T 3/00* (2013.01); *H04N 7/014* (2013.01); *H04N 19/00606* (2013.01); *H04N 19/00721* (2013.01)
USPC ............ 375/240.16; 375/240.12; 375/240.15; 375/240.14; 382/238; 382/236; 382/239; 382/232

(58) Field of Classification Search
CPC ..... H04N 7/50; H04N 7/26244; H04N 7/462; H04N 7/30
USPC ............ 375/240.16, 240.12, 240.15, 240.14; 382/238, 236, 239, 232
See application file for complete search history.

(56) References Cited

U.S. PATENT DOCUMENTS 6,693,963 B1 * 2/2004 Taniguchi ................. 375/240.11
7,826,671 B2 * 11/2010 Zhou et al. ..................... 382/232

(Continued)

FOREIGN PATENT DOCUMENTS

WO 02/47382 A2 6/2002

*Primary Examiner* — Shawn An
(74) *Attorney, Agent, or Firm* — Richard Bachand; Duane Morris LLP (57) ABSTRACT

A method for processing a video image sequence with a number of successive images and an image processing device for processing a video image sequence are described. The method comprises:
generation of at least one scaled image sequence (F11, F12) from the video image sequence (F);
generation of a motion-compensated scaled image sequence (F40) from the scaled image sequence (F50);
generation of a motion-compensated output image sequence (F') from the scaled image sequence (F40);
wherein the generation of the motion-compensated scaled image sequence (F40) comprises the determination of a motion vector field based on at least two images (F11$_{n-1}$; F11$_n$) of the scaled image sequence (F11, F12) and the interpolation of an image using the at least two images and the motion vector field, and
wherein the at least one input scaling factor (S11, S12) is dependent on motion information that is represented by at least one motion vector field that was determined for the temporally preceding images of the at least one scaled image sequence (F11, F12).

7 Claims, 4 Drawing Sheets

(56) References Cited

U.S. PATENT DOCUMENTS 8,446,964 B2 * 5/2013 MacInnis et al. ........ 375/240.29
2002/0181589 A1 * 12/2002 Wake et al. .............. 375/240.14
2005/0232354 A1 * 10/2005 Chen ........................ 375/240.16
2007/0279523 A1 * 12/2007 Yamauchi .................... 348/441

* cited by examiner

| S10 | BI |
|---|---|
| $S10_1$ | $I0, BI_1$ |
| $S10_2$ | $[BI_1, BI_2]$ |
| $S10_3$ | $[BI_2, BI_3]$ |
| $S10_4$ | $[BI_3, BI_4]$ |
| $S10_5$ | $[BI_4, BI_5]$ |

FIG. 5

IMAGE PROCESSING METHOD WITH MOTION ESTIMATION AND IMAGE PROCESSING ARRANGEMENT

This application claims the benefit of German Patent Application No. 102009026983.5, filed Jun. 16, 2009.

FIELD OF THE INVENTION

The present invention relates to an image-processing method with motion estimation.

In image processing, motion estimation serves to determine the movement information of two—typically successive—images of an image sequence. The motion information is information on how individual areas of an image vary from one image to the next, or how the spatial position of individual objects occurring in the image sequence changes from one image to the next.

The motion information acquired on the images of an image sequence can be used to interpolate intermediate images with the correct direction of motion between individual images of an image sequence. In a motion-correct interpolation method of this type, an intermediate image is interpolated in such a manner that an object that is at a first position in a first image and at a second position in a second image is situated in the intermediate image at a third position between the first and the second positions, wherein the spatial position of the third position relative to the first and second positions corresponds to the relative temporal position of the intermediate image between the first and the second image.

The determination of motion information comprises, for example, the definition of image blocks and the determination of so-called motion vectors for the individual image blocks. A motion vector assigned to an image block contains information on how the position of the contents of this image block changes from one image to the next. To determine such motion vectors, it is possible in principle to compare arbitrary image blocks in two successive images to one another. The so-called estimation area in this case comprises the entire image, i.e., an image block at any position in one image can be compared to an image block at any position in the other image. However, this requires image memories that can store entire images and that have the images to be compared stored in them during the motion estimation and that further have sufficiently short access times such that the motion estimation can be performed in real time. Such memories are expensive, however, or are not even available for full images in HD format (1080×1920 pixels).

For reasons of cost, the estimation area is therefore limited to a fraction of the entire image. This has the disadvantage, however, that it may no longer be possible to detect very fast movements correctly.

The problem of the present invention is therefore to provide an image-processing method with motion estimation that is capable of reliably estimating rapid movements and that can nevertheless be cost-effectively realized and to provide a device for performing such a method.

An example of the method according to the invention for processing a video image sequence with a number of successive images comprises: generation of at least one scaled image sequence from the video image sequence, with this generation comprising the scaling of the images in a video image sequence with at least one input scaling factor; generation of a motion-compensated output image sequence from the motion-compensated image sequence, with this generation comprising the scaling of the motion-compensated scaled image sequence with an output scaling factor. The generation of the motion-compensated scaled image sequence in this method comprises the determination of a motion vector field based on at least two images of the scaled image sequence and the interpolation of an image using the at least two images and the motion vector field. The at least one input scaling factor here is dependent on motion information that is represented by at least one motion vector field that was determined for the temporally preceding images.

In particular, the input scaling factor is less than or equal to one. Thus a motion estimation and an interpolation take place in this method based on an image sequence that is obtained from the input video image sequence by downscaling. For a given memory size of a buffer for use for the motion estimation, the method of the invention allows a motion estimation over a larger image area. If the buffer has a given capacity, then the estimation area with the method of the invention is larger by a factor x, where x is the inverse of the scaling factor, than in a conventional method, in which the motion estimation is applied to unscaled images.

In one example it is provided that the images of the video image sequences are scaled differently in the horizontal and in the vertical direction, specifically, with a horizontal scaling component of the input scaling factor in the horizontal direction and with a vertical scaling component of the input scaling factor in the vertical direction. The enlargement of the estimation area in the vertical direction corresponds to the inverse of the horizontal scaling component, and in the vertical direction, to the inverse of the vertical scaling component.

The scaling of the video image sequence and the generation of the motion-compensated image sequence from the scaled image sequence inevitably lead to a loss of information in the interpolation of the images of the motion-compensated image sequence. The smaller the input scaling factor is, i.e., the more intensely the images are scaled down, the greater is the information loss. A small scaling factor appears, for example, whenever long motion vectors, which indicate fast movements, are present in vector fields for preceding images of the scaled image sequence, so that the estimation area for a current motion estimation is to be enlarged by reduction of the scaling factor. This loss of information increases the risk of estimation errors in the motion estimation and thus the risk of an erroneous interpolation. The increasing risk of error in an enlargement of the estimation area is tolerable, however, since the resulting errors in the motion-compensated image sequence are usually less visible to the human eye in image sequences with fast movements than comparable errors for movements with low speeds.

Suitable motion information for the adjustment of the input scaling factor is, for example, the magnitude of a longest motion vector in one or more motion vector fields or the average of the magnitudes of one or more motion vectors of one or more motion vector fields. The input scaling factor is smaller the larger this absolute value or this average is.

In order to avoid frequent changes of the input scaling factor, it is provided in one example that a number of successive motion vector fields are evaluated and the input scaling factor is changed, for example, only if the motion information in a plurality of evaluated motion vector fields leads to a different input scaling factor than a currently set scaling factor. In this case, the scaling factor that occurs most frequently based on the motion information of the individual vector fields is set as the scaling factor.

Examples will be explained in detail below with reference to figures. These figures serve to illustrate the basic principle of the present invention, so that only the features necessary for comprehension of this basic principle are shown. Unless otherwise indicated, identical reference numbers in the figures represent features with identical meaning.

Figure 1:
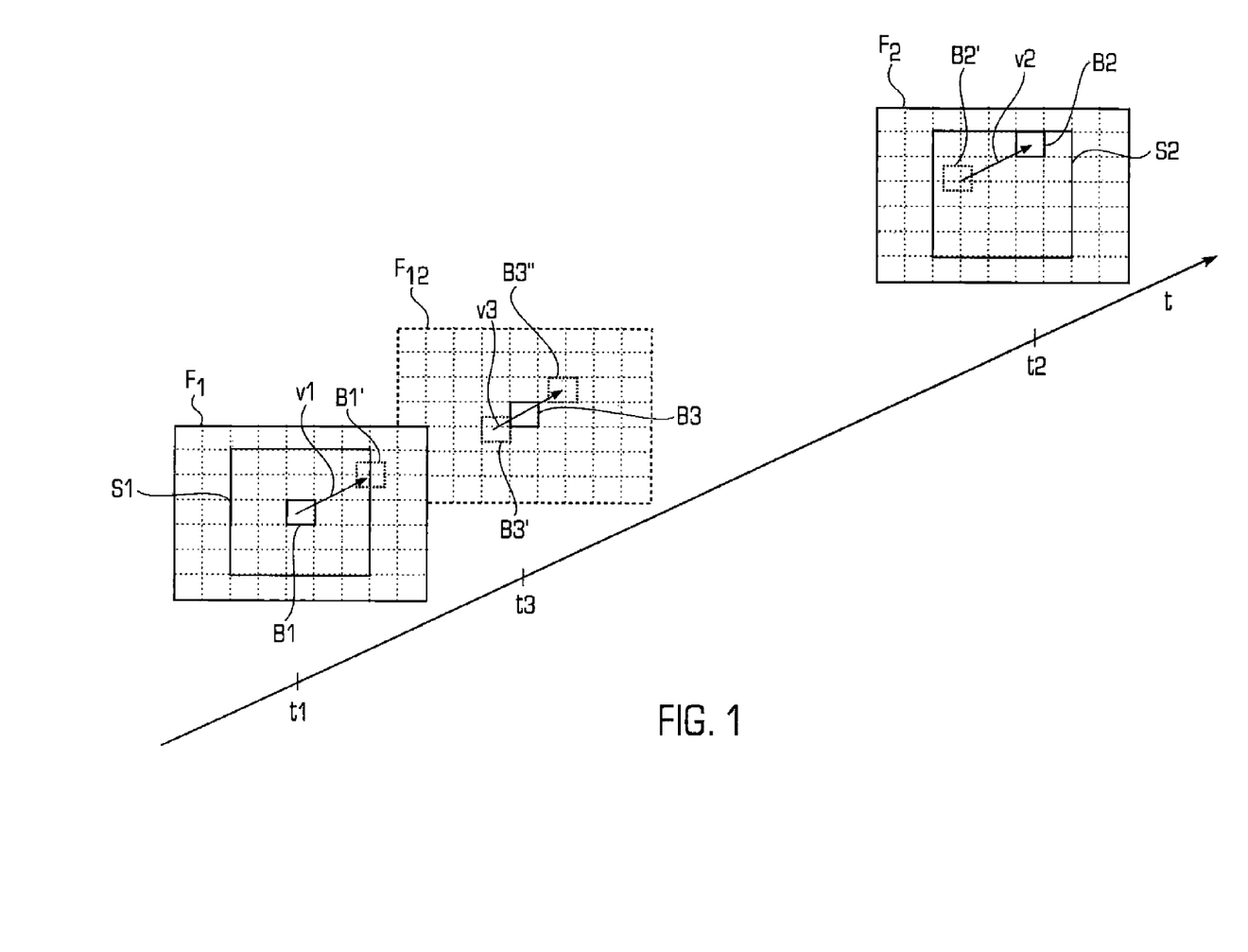
FIG. 1 schematically illustrates an example of an image sequence with temporally successive images.

FIG. 1 schematically illustrates an image sequence with temporally successive images. Two images $F_1$, $F_2$ of this image sequence are shown in FIG. 1. Each of these images comprises a number of pixels arranged in a matrix-like manner, wherein each of these pixels is associated with an image information value. For an RGB image, three color information values are associated with each pixel: one color information value for each of the three primary colors red (R), green (G) and blue (B). For a YUV image, a luminance value (Y value) and two chrominance values (U value, V value) are associated with each pixel. The image contents of such an image sequence, or the image information values associated with the individual pixels, can be displayed in a fundamentally known manner on a display device such as a television display.

For a number of reasons it can make sense to determine the motion contained in the images of such an image sequence. An impression of a moving picture arises from such an image sequence if objects are displayed in different positions in temporally successive images of the image sequence. This motion information can be used to compress a data stream representing the image sequence, as is the case for instance, with the MPEG coding process. This motion information can also be used, however, to interpolate one or more intermediate images with correct motions between two images of the image sequence. The reference character $F_{12}$ in FIG. 1 designates such an intermediate image that is arranged temporally between the previously explained images $F_1$ and $F_2$.

Motion estimation methods are fundamentally known. For better understanding of the invention, some aspects of motion estimation methods will be briefly explained below with reference to FIG. 1:

Motion estimation comprises the determination of a motion vector field by comparison of at least two respective different images of the image sequence. For example, these images are two temporally directly successive images such as the images $F_1$, $F_2$ according to FIG. 1. The motion vector field contains in general information as to whether the contents of individual areas of the two images $F_1$, $F_2$ change from one image $F_1$ to the other image $F_2$.

Such a motion vector field can be produced, for example, by subdividing the first image $F_1$ into a number of image blocks that are arranged in a matrix pattern and that are shown in FIG. 1 using dashed lines. B1 in FIG. 1 labels such an image block of the first image $F_1$. Each of these image blocks comprises, for example, 8×8 or 16×16 pixels. The determination of a motion vector v1 for the image block B1 comprises a comparison of the contents of the image block B1 to the image blocks of the same size in the second image $F_2$, wherein these image blocks need not necessarily lie in the block raster in which the first image block lies. The motion vector v1 designates the spatial offset between the first image block B1 and an image block B1' in the second image $F_2$, whose contents correspond to the contents of the image block B1. To illustrate the motion vector v1, the position of the image block B1' originating from the second image $F_2$ is shown in the first image $F_1$ in FIG. 1.

Any desired known method, in particular, recursive methods, can be used to locate the image block B1' whose contents correspond to the image block B1, and thus to determine the movement vector v1. In a recursive estimation method, a number of possible motion vectors, so-called test vectors, are specified, which are tested one after the other by comparing the image contents of the image block B1 from the first image $F_1$ to the image contents of the image block to which the respective test vector points in the second image $F_2$. The test vector that has led to the best comparison results is selected as the motion vector in such a method. The less the two compared image blocks differ from one another, the better the comparison result is.

The test vectors are, for example, vectors that were determined previously for spatially or temporally adjacent image blocks of the image block B1. Spatially adjacent image blocks here are image blocks that are inside the first image $F_1$ and that are arranged spatially adjacent to the position of the first image block B1. Temporally adjacent image blocks are image blocks that are situated at the same position as the image block B1 in images that temporally precede the first image B1. Spatially and temporally adjacent image blocks are image blocks that are situated in preceding images at positions that are spatially adjacent to the position of the image block B1. Apart from the motion vectors of spatially and/or temporally adjacent image blocks, motion vectors of spatially and/or temporally adjacent image blocks that were modified by addition or subtraction of so-called update vectors are suitable as motion vectors.

In the previously explained example, the motion vectors determined for the image blocks of the first image $F_1$ form a motion vector field determined by comparison of the first and second images $F_1$, $F_2$.

With reference to FIG. 1, such a vector field can also be determined by subdividing the second image $F_2$ into individual image blocks and determining a movement vector by comparison of each of these to image blocks in the first image $F_1$. B2 in FIG. 1 labels such an image block of the second image. $F_2$. v2 labels a motion vector determined for this image block $F_2$.

If the motion information is to be used for intermediate image interpolation, then there is also the possibility of subdividing the image to be interpolated into image blocks and associating with each of these image blocks a motion vector by comparison of image blocks of the first and second images $F_1$, $F_2$ as is shown in FIG. 1 for an image block B3 of the interim image $F_{12}$. In FIG. 1, v3 labels the motion vector determined for this image block B3.

As explained, a motion estimation requires a comparison of the image contents of image blocks in the first and second images $F_1$, $F_2$. To determine the motion vector of an image block it can be necessary, as explained, to carry out several comparison steps, in each of which two image blocks in the first and the second images $F_1$, $F_2$ are compared to one another. The comparison of two image blocks in the first and second images $F_1$, $F_2$ is referred to below as a block comparison. It should be possible to perform such block comparisons, and thus the motion estimation, in real time, i.e., within a span of time that corresponds to the time difference of two images in the image sequence. For this purpose, it is necessary to store image sections of the first and second images $F_1$, $F_2$, from which the image blocks originate, in semiconductor memories, from which the image information necessary for the block comparison can be rapidly read out.

It would be ideal in this respect if the two images $F_1$, $F_2$ were stored completely in such rapidly readable memories. In this case, image blocks at arbitrary positions of the two images could be compared with one another for purposes of the motion estimation. The so-called estimation area would then comprise the entire image area, whereby even very rapid movements could be estimated. A rapid movement is represented by a long motion vector. A quickly moving object is thus situated in the two successive images at positions that have a large distance between one another.

For reasons of cost or technical feasibility, known devices or known methods for motion estimation use buffers or cache memories, in which the images to be compared cannot be stored in their entirety, so that it is not possible to access the entire image contents in the motion estimation. These buffers are dimensioned, for example, in such a manner that only an image section of the first and second images can be stored. Such an image section S1, as is used, for example, for the determination of a motion vector for the image block B1 in the first image $F_1$, is schematically represented in FIG. 1. The image contents of this image section S1 and of an additional image section S2 of the second image $F_2$, which is situated at the same position as the first image section S1 and has the same size, are stored for purposes of block comparisons. The image sections S1, S2 are, for example, selected such that the image block B1 to be investigated is arranged centrally in the image sections S1, S2 to be stored. The size of these image sections S1, S2 determines the estimation area, i.e., the maximum length of motion vectors that can be determined using these image sections S1, S2. Motion vectors that point to image blocks lying outside this estimation range cannot be tested or cannot be determined in the known method. The estimation area comprises between 40×150 and 80×150 pixels, for example.

In order to be able to adapt the estimation area to a given memory size of a buffer used for motion estimation, it is provided according to the method of the invention that the motion estimation and interpolation are applied to a downscaled image sequence, and the scaling factor is adjusted adaptively to a measurement of motion previously determined in the image sequence. In comparison to the images of the unsealed image sequence, instantaneous images of the downscaled image sequence become smaller the faster the movements are that were determined in preceding images of the scaled image sequence.

An example of such a method and an example of an image processing arrangement for performing such a method will be described below based on FIG. 2, in which a block schematic diagram of an image processing arrangement is represented.

The image processing arrangement shown in FIG. 2 comprises a scaling arrangement with a first scaling unit 11, to which a video image sequence F—referred to below as an input image sequence—with temporally successive images is supplied. This image sequence F is, for example, an image sequence with original images $F_1$, $F_2$ such as were explained with reference to FIG. 1.

The first scaling unit 11 generates a first scaled image sequence F11 from the input image sequence F, wherein the generation of the first scaled image sequence F11 comprises the scaling of the images of the input image sequence F with a first input image scaling factor S11. The first input scaling factor S11 is generated in a manner yet to be explained by an evaluation and control circuit 60. The input scaling factor S11 is less than or equal to one (S11≤1), so that the image sizes of the images in the first scaled image sequence F11 are less than or equal to the image size of the images in the unsealed input image sequence F. The input image sequence F is, for example, a so-called HD image sequence. Each of the images of such an image sequence comprises 1920×1080 pixels, thus comprising 1080 rows and 1920 columns.

The input scaling factor comprises two scaling components: a horizontal scaling component $S11_x$, which determines the scaling of the images of the input image sequence F in the row direction or the horizontal direction, and a vertical scaling component $S11_y$, which determines the scaling of the images in the input image sequence F in the column direction or vertical direction. The horizontal and vertical scaling components can be identical, in which case there is a symmetrical scaling of the images. The horizontal and vertical scaling components $S11_x$, $S11_y$ can also be different, however, in which case there is an asymmetrical scaling of the images.

The first scaling unit 11 can be any desired conventional scaling unit that is capable of scaling a video image with a predetermined scaling factor. This scaling, i.e., generation of an image of the scaled image sequences F11 from an image of the input image sequence F, can comprise a pure subsampling of the input image, for example, but can also contain filtering.

The first scaled image sequence F11 is supplied to a memory arrangement with a first memory unit 21, wherein the first memory unit 21 is constructed to store at least two successive images $F11_{n-1}$, $F11_n$ of the first scaled image sequence F11.

In addition, the image processing arrangement comprises a motion estimation and interpolation unit 40 that accesses the first memory arrangement 21 and that is constructed to generate a motion-compensated scaled image sequence F40 from the first scaled image sequence F11. This motion-compensated scaled image sequence F40 can comprise original images and interpolated intermediate images, as was explained for an unsealed image sequence with reference to FIG. 1. "Original images" in this context are images of the first scaled image sequence F11, i.e., images that have originated only by scaling—and possibly filtering—from images of the input image sequence F, such as the images $F_1$, $F_2$ according to FIG. 1. The motion-compensated scaled image sequence can also be generated, however, in such a manner that it comprises only interpolated images. The latter is the case, for example, if an image sequence with a different motion phase is to be generated from the scaled first image sequence F11. Accordingly, an image frequency of the motion-compensated scaled image sequence F40 can be higher than an image frequency of the scaled image sequence F11 or can correspond to the image frequency of the scaled image sequence F11.

Depending on the desired image frequency of an output image sequence F' generated by the image processing device, the motion estimation and interpolation unit 40 can be constructed to generate one or more images for each original image, in which case at least one image is interpolated for every original image, either as a replacement of the original image or as an intermediate image between two original images. The motion estimation and interpolation unit 40 functions like a conventional motion estimation and interpolation unit, which is constructed to produce a motion-compensated image sequence with interpolated images from an input image sequence, but with the difference that images of a downscaled image sequence F11 are supplied to the motion estimation and interpolation unit 40 according to FIG. 2.

The motion estimation and interpolation unit 40 comprises a motion estimation unit 41, a buffer memory 42, a vector memory 43 and an interpolation unit 44. The buffer memory 42 serves for interim storage of image sections Sn−1, Sn of the at least two images $F_{n-1}$, $F_n$ of the first scaled image sequence F11 that are stored in the memory arrangement 21. The motion estimation unit 41 accesses this interim memory 42 in order to generate a motion vector field based upon the at least two images $F_{n-1}$, $F_n$ stored in the first memory unit 21. This motion vector field or the individual motion vectors of this motion vector field are stored in the vector memory. The motion estimation performed by the motion estimation unit 41 and the associated determination of the motion vectors are based, for example, on a method explained in connection with FIG. 1, but with the difference that the motion estimation is not applied to the unsealed image sequence F, but rather to the scaled image sequence F11.

The buffer memory 42 is selected such that image sections comprising between 40×150 and 80×250 pixels, for example, can be stored. The image sections stored in the buffer memory 42 are replaced by other image sections from the first memory unit 21 whenever the image sections previously stored in the buffer memory 42 have been "worked off." This process is continued until a complete motion vector field for the at least two stored images has been determined. In particular, the size of the blocks for which a respective motion vector is determined is not influenced by the scaling factor S11. The smaller the scaling factor is, i.e., the smaller the images of the downscaled image sequence F11 are, the lower will be the number of motion vectors in a motion vector field.

The motion vectors of a vector field are associated with, for example, image blocks of an intermediate image to be interpolated. If more than one intermediate image is to be interpolated between two original images, then the motion estimation unit 41 generates a number of motion vector fields from the stored images $F_{n-1}$, $F_n$ that corresponds to the number of intermediate images to be interpolated. In this connection, it can be pointed out that the use of two successive images $F_{n-1}$, $F_n$ of the scaled image sequence F11 for determining a motion vector field is to be considered only an example. There is of course also the possibility of using more than two successive images of the scaled image sequence F11 to determine a motion vector field. Such methods are fundamentally known, so that further explanations regarding them can be dispensed with.

The interpolation unit 44 generates the motion-compensated scaled image sequence 40 using the images stored in the memory unit 21 and the motion vector field stored in the vector memory 43 or the vector fields that are stored in the vector memory 43. The motion-compensated scaled image sequence F40 is generated, for example, in such a manner that the interpolation unit 44 maps the original images stored in the first memory unit 21 unchanged onto the motion-compensated scaled image sequence F40 and interpolates an intermediate image or several intermediate images between the original images using the stored vector field or the stored vector fields.

In particular, the motion estimation and interpolation can take place in real time, i.e., the determination of the motion vector field for the at least two images $F11_{n-1}$, $F11_n$ of the scaled image sequence F11 and the interpolation take place within a time period that corresponds to the inverse of the image frequency of the input image sequence, i.e. at the latest by a point in time at which one of the images stored in the first memory unit 21 is replaced by a subsequent image $F_{n+1}$ (not shown), and the motion estimation and interpolation begin again with the images $F_n$, $F_{n+1}$.

The vector memory 43 can be constructed to store, in addition to the motion vector field determined for the at least two images $F11_{n-1}$, $F11_n$, test vectors of the type used for recursive motion estimation. Correspondingly, the motion estimation unit 41 can be constructed to perform such a recursive motion estimation for determining the motion vector field.

The motion estimation and interpolation unit 40 is followed by an output scaling unit 50, which is constructed to scale the images of the motion-compensated scaled image sequence F40, and in particular, to scale them in such a manner that the downscaling performed by the input scaling unit 11 is "rolled back." This output scaling unit 50 can be a conventional scaling unit that is constructed to enlarge images by a predetermined scaling factor. This scaling—like the scaling performed by the input scaling unit 11—can comprise filtering.

The scaling of the motion-compensated scaled image sequence F40 by the output scaling unit 50 is performed with a scaling factor S20 that corresponds to the inverse of the first scaling factor S10. This output scaling factor S20 can comprise, corresponding to the input scaling factor, two scaling components: a horizontal scaling component $S20_y$ and a vertical scaling component $S20_x$. In particular, the horizontal scaling component $S20_y$ of the output scaling factor S20 is the inverse of the horizontal scaling component $S10_y$ of the input scaling factor S10, and the vertical scaling component $S20_x$ of the output scaling factor S20 is the inverse of the vertical scaling component $S10_x$ of the input scaling factor S10.

Mixing the output image sequence F' with images from the input image sequence F is optionally provided. For this purpose a mixer 70 is provided downstream of the output scaling unit 50 and images of the input image sequence F buffered in an additional memory arrangement 23 are supplied to it. The number of images from the input image sequence F buffered in the additional memory arrangement 23 corresponds, for instance, to the number of images of the scaled image sequence F11 buffered in the first memory unit 21. The mixer 70 is constructed to mix images from the output image sequence F' with images from the input image sequence F. Insofar as the output image sequence F' has a higher frequency than the input image sequence F, the mixer 70 is constructed to duplicate the images of the input image sequence correspondingly, in order thereby to adapt the mixed-in images of the input image sequence to the image frequency of the output image sequence F'.

The image processing arrangement further comprises an evaluation and control unit 60, which generates the scaling factors S10, S20 as a function of at least one motion information item, which is represented by a motion vector field. Instantaneous values of the scaling factors S10, S20 are adjusted here as a function of motion information that is obtained based on the motion vector fields for preceding images of the scaled image sequence F11. To determine the scaling factors, the evaluation and control unit 60 accesses the vector memory 43 of the motion estimation and interpolation unit 40, in which at least one motion vector field is stored at any point in time. This motion vector field contains information on a movement in the at least two images $F_{n-1}$, $F_n$ that are stored in the first memory unit 21. Each of these motion vectors is assigned to an image block of the original image or an image block of an intermediate image to be interpolated in the image sequence F40. Referring to FIG. 1, the motion vector in the latter case contains information as to which image blocks from the least two stored images $F_{n-1}$, $F_n$ are used for interpolation of the image contents of the image block for the intermediate image. A motion vector v comprises a horizontal motion vector component $v_y$ and a vertical motion vector component $v_x$, as well as a magnitude (length) that is expressed by $$|v| = \sqrt{v_x^2 + v_y^2} \qquad (1)$$

The longer a motion vector of an image block for an intermediate image is, the greater is the motion of an object, represented by the image block, in the image sequence.

The motion estimation is performed in the illustrated image processing unit using image sections $F_{n-1}$, $F_n$ of the scaled image sequence F11. In comparison to a motion estimation that is performed based on the unsealed input image sequence F, the estimation area in this image processing arrangement is increased in the horizontal direction by a factor corresponding to the inverse of the horizontal scaling component, and in the vertical direction by a factor corresponding to the inverse of the vertical scaling component. This will be explained with reference to an example illustrated in FIG. 3. FIG. 3 schematically shows an arbitrary image $F_1$ of the unsealed input image sequence F that comprises m×n pixels. Let it be assumed that the buffer memory 42 of the motion estimation and interpolation unit 40 is constructed to store an image section with p1×q1 pixels. The size of this image section corresponds to the estimation area that would be obtained with unsealed processing of the input images. By downscaling the input image sequence F to the scaled image sequence F11, information from a larger area of the input image sequence is present in an image section of size p1×q1, namely image information from an image area of size p2×q2, wherein:

$$p2 = \frac{1}{S10_y} \cdot p1 \qquad (2a)$$

$$q2 = \frac{1}{S10_x} \cdot q1 \qquad (2b)$$

$1/S10y$ is the inverse of the horizontal scaling component and $1/S10x$ is the inverse of the vertical scaling component.

The motion vectors stored in the vector memory 43 are reduced corresponding to the first scaling factor S10. A vector $v0=(v0_x,v0_y)$ stored in the vector memory 43 corresponds in the unsealed image sequence to a larger motion vector V0' with:

$$v0' = \left(v0_x \cdot \frac{1}{S10_x}, v0_y \cdot \frac{1}{S10_y}\right) \qquad (3)$$

The evaluation and control unit 60 takes this scaling into account in evaluating the motion vector field to determine the scaling factors S10, S20. The evaluation and control unit 60 is constructed, for example, to multiply the motion vectors of the stored motion vector field, such as a vector v0' corresponding to equation (3), by the inverse of the input scaling factor S10 in order to obtain a normalized vector field. For the following discussions let it be assumed that, in order to determine the scaling factors S10, S20, the evaluation and control unit 60 generates and evaluates a motion vector field normalized in this manner.

It is provided in one example that the motion information of a vector field used to generate the scaling factors is a maximum value of the magnitudes of all or some motion vectors of a motion vector field. It is provided in another example that the motion information of a motion vector field used to determine the scaling factors S10, S20 is the average value of the magnitudes of all or some motion vectors of the motion vector field. In one example, it is provided that only the maximum value or the mean value of the k longest motion vectors of a motion vector field is to be determined. k is a number between 2 and the number of motion vectors of a motion vector field. k lies, for example, between 10% and 50% of the number of vectors of the motion vector field.

The motion information or the motion vector information value that the evaluation and control unit 60 generates for every normalized motion vector field can comprise, corresponding to the vectors, a horizontal component and a vertical component. A horizontal component of the motion information value is formed, for example, by determining the maximum value of the absolute values of the horizontal vector components of all or some of the motion vectors of the normalized motion vector field and the vertical component is formed, for example, by determining the maximum value of the absolute values of the vertical vector components of all or some motion vectors of the normalized motion vector field. In a corresponding manner, a horizontal motion information value or a vertical motion information value can be obtained by forming the mean value of the absolute values of all or some horizontal or vertical vector components, respectively. Here, as well, there is the possibility of not considering all motion vectors of the motion vector field, but only, for example, the k longest motion vectors of the respective motion vector field.

There are various possibilities for determining the first scaling factor S10, which will be explained below.

In one example, it is provided that only a fixed number of scaling factors is to be provided, of which one is selected. Depending on the evaluated motion information value, these scaling factors can be symmetrical scaling factors, which bring about a scaling in the same manner in the horizontal and the vertical directions, or they can be asymmetrical scaling factors, which allow scaling with different scaling factors in the horizontal and the vertical directions. To determine the scaling factors, it is provided that an interval of motion information values or components of motion information values is associated with each scaling factor or each scaling factor component, and that the scaling factor or scaling factor component whose interval contains the motion information value determined for a motion vector field or the component of the motion information value determined for a normalized motion vector field is chosen as the scaling factor or scaling factor component.

Figure 5:
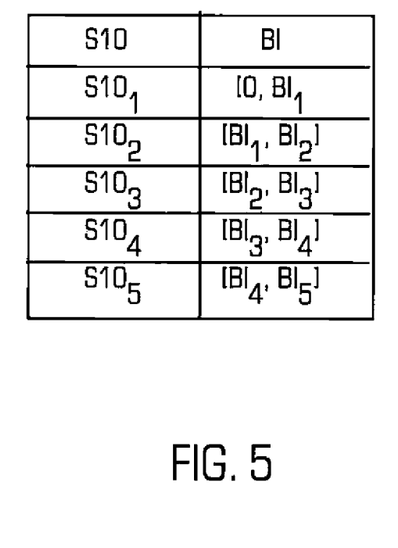
FIG. 5 illustrates an example of the determination of a scaling factor as a function of a motion information item.

FIG. 5 illustrates an example of such a determination of the input scaling factor based on a table that could be implemented in the evaluation and control unit. The left-hand column of the table contains the values that can be set for the scaling factor S10 and the right-hand column contains, for each possible scaling factor, an interval of motion information values BI for which the respective scaling value is selected. With reference to FIG. 5, the scaling factor $S10_2$ is elected, for example, if the determined motion information value lies in an interval $[BI_1, BI_2]$. In this context, it may be mentioned that one of the selectable scaling factors, such as the scaling factor $S10_1$, which is selected for the smallest motion information values, can also be equal to one. Examples for the scaling factors are: $S10_1=1$; $S10_2=\frac{1}{2}$; $S10_3=\frac{1}{3}$; $S10_4=\frac{1}{4}$; $S10_5=\frac{1}{5}$.

The table shown in FIG. 5 can be used for scaling factors for symmetrical scaling, but can also be used for the determination of a scaling factor for asymmetrical scaling. In the latter case, the table must be applied separately to each of the two scaling components.

In order to avoid a frequent change of the scaling factor, it is provided in one example that a respective number of successive motion vector fields are evaluated, for example, between 10 and 50 motion vector fields, and after evaluation of these motion vector fields, the scaling factor is set that results from the plurality of motion information values determined based on the evaluated motion vector fields.

Figures 2, 3:
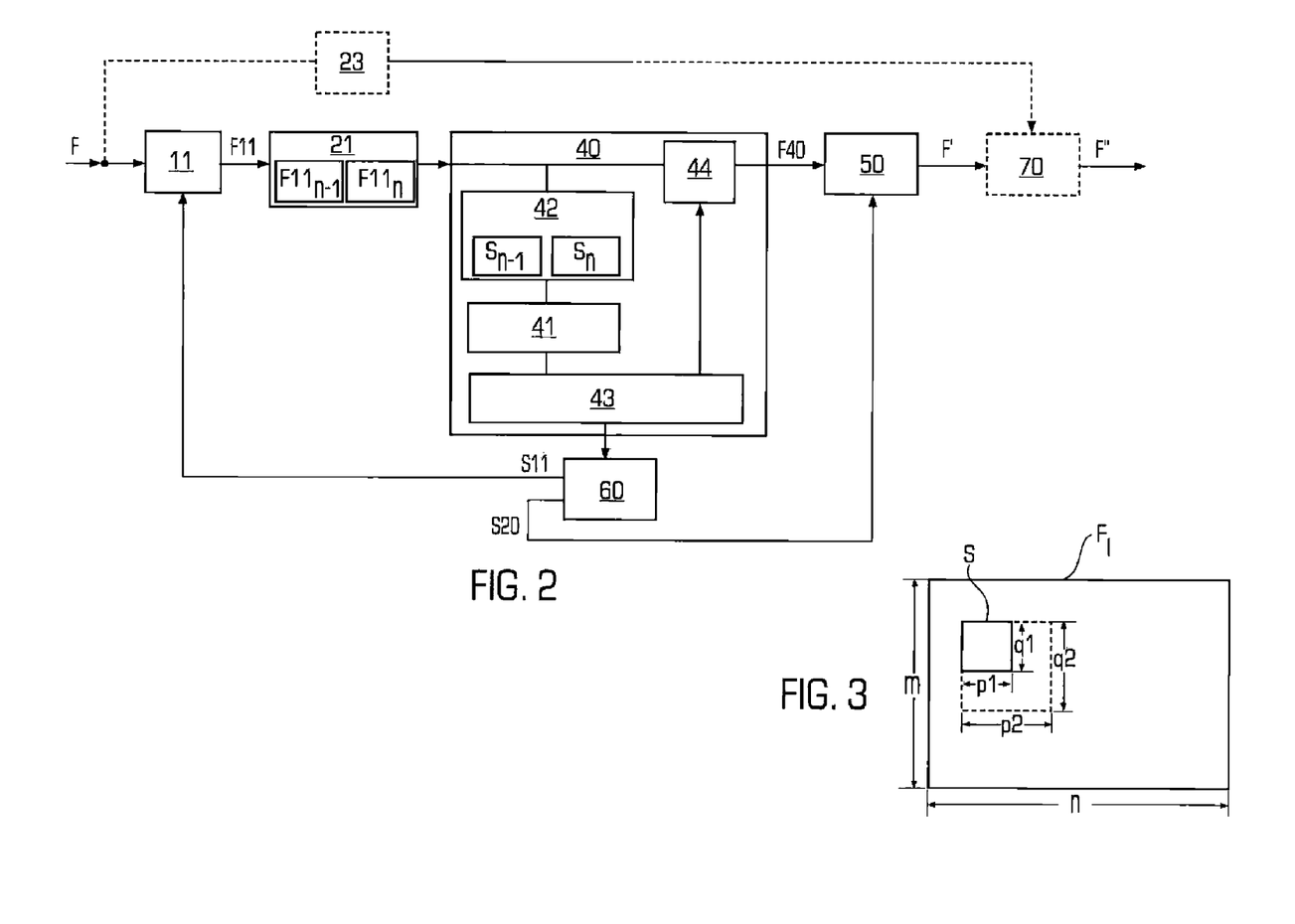
FIG. 2 illustrates, based on a block schematic diagram, an example of an image processing arrangement with a motion estimation and interpolation unit for performing an image processing method according to an example of the invention.
FIG. 3 illustrates the size, as a function of a scaling factor, of an image section to be stored in a memory of the motion estimation unit.

In the image processing arrangement illustrated in FIG. 2, motion estimation is possible only between images of the same size. After a change of the scaling factor from a value $S11_{k-1}$ to a value $S11_k$, an image estimation is not possible between two images of the scaled image sequence F11, namely between the last image that was scaled with the factor $S11_{k-1}$ and the first image that was scaled with the scaling factor $S11_k$.

Figure 4:
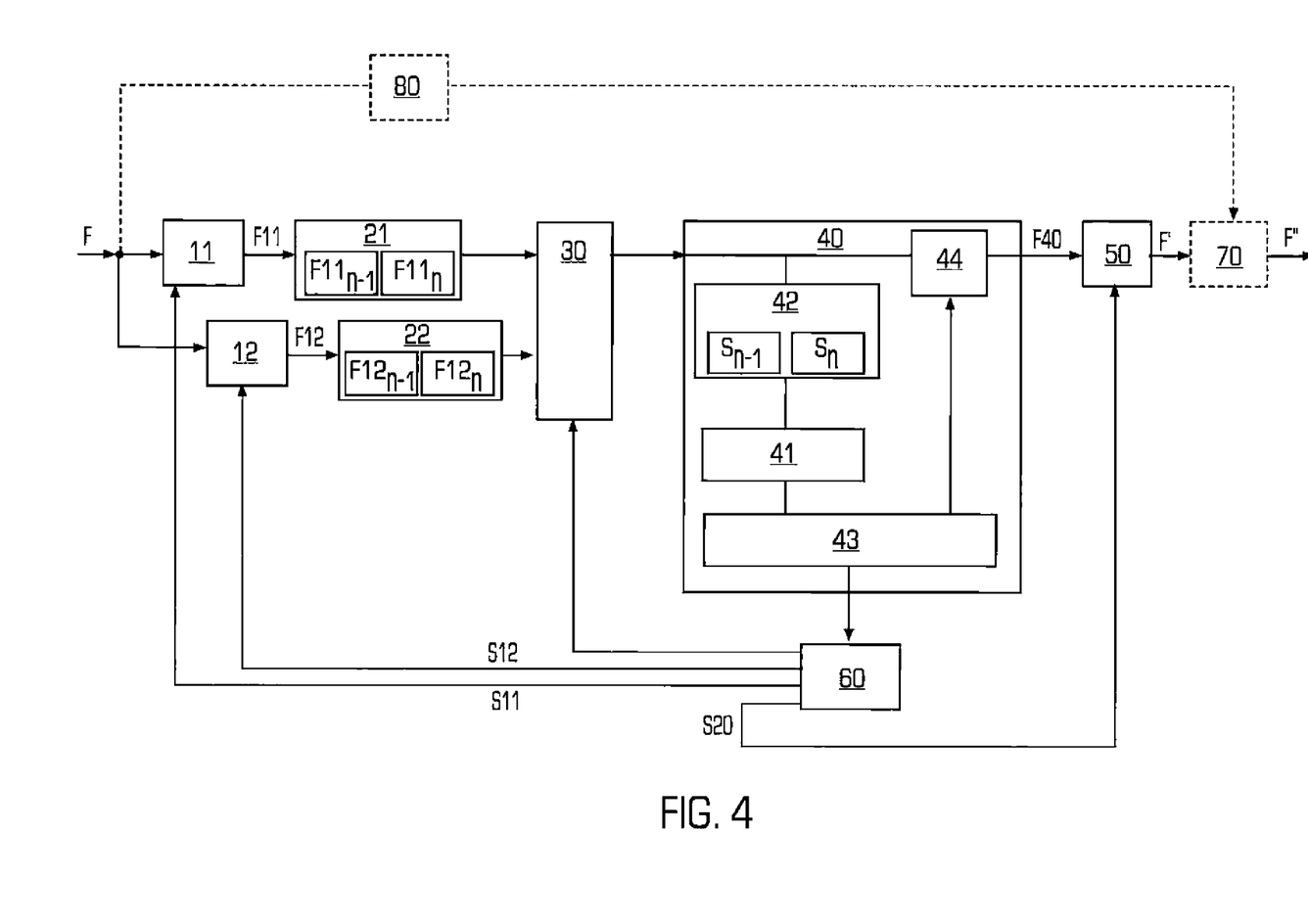
FIG. 4 illustrates, based on a block schematic diagram, an example of an image processing arrangement with a motion estimation and interpolation unit for performing an image processing method according to an additional example of the invention.

In order to enable a continuous motion estimation, i.e., a motion estimation between all successive images, a second scaling unit 12 according to FIG. 4 can be provided, as well as a second memory unit 22 downstream of the second scaling unit 12. From the input image sequence F, the second scaling unit 12 generates a second scaled image sequence F12 that is scaled relative to the input image sequence F by a second scaling factor S12. The second memory unit 22 downstream of the second scaling unit 12 is constructed to store at least two successive images of the second scaled image sequence F12. In other respects, the explanations given for the first soling unit 11 and the first memory unit 21 in connection with FIG. 2 apply accordingly to the second scaling unit 12 and the second memory unit 22

A selection unit 30, by means of which the motion estimation and interpolation unit 40 accesses the images stored in the first memory unit 21 or in the second memory unit 22 for motion estimation and interpolation, is connected between the memory units 21, 22 and the motion estimation and interpolation unit 40. In this arrangement, the evaluation and control unit 60 controls which of the two memory units 21, 22 is accessed by the motion and interpolation unit 40. Based on the motion vector fields that are determined for one of the scaled image sequences, i.e., F11 or F12, the evaluation and control unit 60 determines a scaling factor for the other of the scaled image sequences and switches the selection circuit 30 when at least two scaled images have been stored in the respective other memory unit 22 after a change of the other scaling factor The method as explained can be easily performed with conventional image processing arrangements that carry out a motion estimation. It is only necessary to add a first scaler corresponding to the first scaler 11 in FIG. 2 upstream of such image processing arrangements, and to add a second scaler corresponding to the scaler 50 in FIG. 2 downstream. In addition, an evaluation and control circuit 60 scaling factor circuit is to be provided that generates the scaling factors for the scalers as a function of information in motion vector fields.

The invention claimed is:

1. A method for processing a video image sequence, comprising:
   generating an input scaling factor based on a speed of movement between corresponding image sections respectively located in current and preceding image frames;
   scaling a size of an image section of the current image frame with the input scaling factor to produce a scaled image;
   motion compensating the scaled image to produce a motion compensated scaled image;
   scaling the motion compensated scaled image with an output scaling factor that is an inverse of the input scaling factor to produce a motion-compensated output image.

2. The method according to claim 1, wherein the input scaling factor comprises a horizontal scaling component for scaling in a horizontal direction of an image and a vertical scaling component for scaling in a vertical direction of an image.

3. The method according to claim 2, wherein the horizontal and vertical scaling components are different.

4. The method according to claim 3, wherein each of the horizontal and vertical scaling components of the input scaling factor lies between 1 and 0.2.

5. The method of claim 1 wherein generating the input scaling factor comprises generating the input scaling factor based on a length of at least one motion vector representing movements between the image sections.

6. The method of claim 5 wherein generating the input scaling factor comprises generating the input scaling factor based on a longest motion vector of a motion vector field representing movements between the image sections.

7. The method of claim 1 wherein generating the input scaling factor comprises generating the input scaling factor based on an average length of motion vectors of a motion vector field of the image section in the current image frame.

* * * * *